United States Patent
Brennan

(10) Patent No.: US 11,038,430 B2
(45) Date of Patent: Jun. 15, 2021

(54) LLCC SECONDARY OVERTONE RESONANT POWER CONVERTER

(71) Applicant: Analog Devices International Unlimited Company, Limerick (IE)

(72) Inventor: Ciaran Brennan, Essex Junction, VT (US)

(73) Assignee: Analog Devices International Unlimited Company, Limerick (IE)

(*) Notice: Subject to any disclaimer, the term of this patent is extended or adjusted under 35 U.S.C. 154(b) by 2 days.

(21) Appl. No.: 16/530,394

(22) Filed: Aug. 2, 2019

(65) Prior Publication Data

US 2021/0036622 A1  Feb. 4, 2021

(51) Int. Cl.
*H02M 3/335* (2006.01)
*H02M 3/337* (2006.01)
(Continued)

(52) U.S. Cl.
CPC ..... *H02M 3/33569* (2013.01); *H02M 1/4258* (2013.01); *H02M 3/3376* (2013.01);
(Continued)

(58) Field of Classification Search
CPC ............. H02M 3/335; H02M 3/33507; H02M 3/33569; H02M 3/33523; H02M 3/3376;
(Continued)

(56) References Cited

U.S. PATENT DOCUMENTS 5,623,187 A    4/1997  Caldeira et al.
5,638,260 A *  6/1997  Bees ................... H02M 3/3376
                                                 363/17

(Continued)

FOREIGN PATENT DOCUMENTS

CN    203387407 U    1/2014
CN    101895201 B    6/2015
(Continued)

OTHER PUBLICATIONS

A. Bucher; T. Duerbaum; J. Stahl; "Rapid simulation of multi-resonant LLCC converters with capacitive output filter based on an extended first harmonic approximation"; Nov. 1, 2010; IEEE; 2010 IEEE Energy Conversion Congress and Exposition; pp. 4041-4048 (Year: 2010).*

Ang, Yong-Ann, et al., "Digital Control of Dual-Load LCL Resonant Converters", IEEE 2005 European Conference on Power Electronics and Applications, (2005), 10 pgs.

(Continued)

*Primary Examiner* — Thienvu V Tran
*Assistant Examiner* — Shahzeb K Ahmad
(74) *Attorney, Agent, or Firm* — Schwegman Lundberg & Woessner, P.A.

(57) ABSTRACT

An LLCC Secondary Overtone Resonant (LLCC-SOR) power converter obtains dramatically higher efficiency with light loads by providing a resonance in the transformer secondary that is approximately tuned to an odd order overtone of the upper primary switching frequency, an upper frequency limit of the primary switching frequency, and a secondary duty cycle control that engages once the upper primary switching frequency limit is reached. The transformer circuit resonates in an LLCC-SOR mode that regulates the output voltage when the maximum frequency limit is reached. In operation, the gain of the resonant circuit is raised above its regulation point under light loads, forcing the controller into duty cycle mode. The secondary current completes an odd number of oscillations per single oscillation of the primary current, and the primary current returns to near zero after each switching transition. Also, a zero-voltage switching condition is maintained on the primary switch.

20 Claims, 9 Drawing Sheets

(51) Int. Cl.
*H02M 1/42* (2007.01)
*H02M 1/00* (2006.01)

(52) U.S. Cl.
CPC ... *H02M 3/33515* (2013.01); *H02M 3/33523* (2013.01); *H02M 2001/0003* (2013.01)

(58) Field of Classification Search
CPC ..... H02M 3/33515; H02M 2001/0003; H02M 1/42; H02M 1/4241; H02M 1/4258
See application file for complete search history.

(56) References Cited

U.S. PATENT DOCUMENTS

| | | | | |
|---|---|---|---|---|
| 7,554,822 | B2 | 6/2009 | Waffenschmidt et al. | |
| 9,450,496 | B2* | 9/2016 | Sigamani | H02M 3/33546 |
| 9,705,413 | B2* | 7/2017 | Zhang | H02M 3/33569 |
| 9,768,700 | B2* | 9/2017 | Oh | H02M 1/44 |
| 10,116,279 | B2 | 10/2018 | Ritter et al. | |
| 10,277,140 | B2 | 4/2019 | Jia et al. | |
| 10,680,526 | B2* | 6/2020 | Zhuo | H02M 3/33523 |
| 2013/0194831 | A1* | 8/2013 | Hu | H02M 3/33569 363/21.01 |
| 2013/0194832 | A1 | 8/2013 | Han et al. | |
| 2013/0201726 | A1* | 8/2013 | Hu | H02M 3/335 363/17 |
| 2015/0229225 | A1* | 8/2015 | Jang | H02M 3/33569 363/17 |
| 2018/0241299 | A1* | 8/2018 | Jitaru | H02M 3/33592 |
| 2020/0195155 | A1* | 6/2020 | Colbeck | H02M 1/36 |

FOREIGN PATENT DOCUMENTS

| | | |
|---|---|---|
| CN | 103326587 B | 9/2015 |
| KR | 101844981 B1 | 4/2018 |

OTHER PUBLICATIONS

Ang, Yong-Ann, et al., "Modelling and Regulation of Dual-Output LCLC Resonant Converters", The 33rd Annual Conference of the IEEE Industrial Electronics Society (IECON), (2007), 2130-2135.
Chen, Wei, et al., "High Efficiency Soft-switched Step-up DC-DC Converter with Hybrid Mode LLC+C Resonant Tank", Twenty-Fifth Annual IEEE Applied Power Electronics Conference and Exposition (APEC), (2010), 1358-1364.
Deppe, Carsten, et al., "Resonant Standby Mode for LLCC Load Resonant Power Converters", 2005 European Conference on Power Electronics and Applications, (2005), 10 pgs.
Lin, Faa-Jeng, et al., "An Adaptive Fuzzy-Neural-Network Controller for Ultrasonic Motor Drive Using the LLCC Resonant Technique", IEEE Transactions on Ultrasonics, Ferroelectronics, and Frequency Control, 46(3), (May 1999), 715-727.
Lin, Faa-Jeng, et al., "Fuzzy Neural Networks for Identification and Control of Ultrasonic Motor Drive with LLCC Resonant Technique", IEEE Transactions on Industrial Electronics, 46(5). (Oct. 1999), 999-1011.
Ryu, Seung-Hee, et al., "Adjustable Frequency—Duty-Cycle Hybrid Control Strategy for Full-Bridge Series Resonant Converters in Electric Vehicle Chargers", IEEE Transactions on Industrial Electronics, 61(10),(Oct. 2014), 5354-5362.
Wu, Xinke, et al., "Analysis and Design Considerations of LLCC Resonant Multi-Output Dc/Dc LED Driver with Charge Balancing and Exchanging of Secondary Series Resonant Capacitors", IEEE Transactions on Power Electronics, 30(2), 780-789, (2014), 10 pgs.
Yang, Bo, et al., "LLC Resonant Converter for Front End DC/DC Conversion", Seventeenth Annual IEEE Applied Power Electronics Conference and Exposition (APEC), vol. 2, (2002), 1108-1112.
Yang, Dongdong, et al., "A Variable Duty Cycle Soft Start-up Strategy for LLC Series Resonant Converter Based on Optimal Current Limiting Curve", IEEE Transactions on Power Electronics, 31(11), 7996-8006, (2016), 10 pgs.

* cited by examiner

LLCC SECONDARY OVERTONE RESONANT POWER CONVERTER

FIELD OF THE DISCLOSURE

This document relates to resonant power converters and, in particular, to an LLCC secondary overtone resonant power converter that improves the light load efficiency of an LLC resonant power converter.

BACKGROUND

The LLC resonant power converter is used to transform one power supply voltage to a second regulated voltage and is used with transformers to isolate the second voltage from the first voltage. The LLC resonant power converter is a popular architecture due to its favorable high load efficiency and electromagnetic interference (EMI) characteristics, particularly due to its zero-voltage switching (ZVS) of the primary switches, which may greatly reduce switching losses in the power field-effect transistors (FETs). However, a limitation of the LLC configuration is low efficiency at low power levels. The LLC resonant power converter maintains a large resonating current in the primary circuit that remains fairly constant at light loads, and the losses associated with this current degrade its light load efficiency.

There are numerous proposed techniques for improving the light load efficiency of LLC resonant power converters. Such techniques include using a second resonance mode that is a different tuning of the primary frequency or using a phase control technique on the full bridge switch where positive and negative switching phases are shifted so that they partially overlap. Other techniques include burst mode frequency control, phase-shifted gating, and pulse-width modulation (PWM) control strategies for resonant converters when under light loads. Techniques to achieve higher light load efficiency than is available under any of these approaches remain desirable.

SUMMARY OF THE DISCLOSURE

This document relates to resonant power converters and, in particular, to an LLCC secondary overtone resonant power converter that improves the light load efficiency of an LLC resonant power converter.

The LLCC Secondary Overtone Resonant (LLCC-SOR) power converter described herein obtains dramatically higher efficiency with light loads compared to a standard LLC resonant power converter by providing a resonance in the transformer secondary that is approximately tuned to an odd order overtone (e.g., $3^{rd}$, $5^{th}$, $7^{th}$, $9^{th}$ harmonics, etc.) of the upper primary switching frequency, an upper frequency limit of the primary switching frequency, and a secondary duty cycle control that engages once the upper primary switching frequency limit is reached. These features together allow the transformer circuit to resonate in an entirely different mode than the standard LLC mode. When in this different mode, the LLC resonant power converter achieves high conversion efficiency even under the lightest of load conditions.

This different mode is referred to herein as an LLCC-SOR mode and this mode is used to regulate the output voltage when the maximum frequency limit is reached (e.g., hysteretic, burst mode or PWM control). In sample embodiments, a parallel LC resonant tank circuit on the transformer secondary is approximately tuned to an odd order overtone (harmonic) of the primary switching frequency, such that one or more of the following characteristics are established:

The gain of the resonant circuit is raised above its regulation point under light loads, forcing the controller into duty cycle mode;

The secondary current completes an odd number of oscillations per single oscillation of the primary current;

The primary current returns to near zero after each switching transition, reducing power draw from the supply; and The zero-voltage switching (ZVS) condition is maintained on the primary switch.

In sample embodiments, an LLCC resonant power converter includes a switching circuit that receives a direct current input voltage and provides an alternating output voltage to a primary transformer winding in first and second resonant operating modes, a rectifier that converts an alternating current at a secondary transformer winding into a direct current output voltage for application to a load, and a feedback circuit that generates a control signal to reduce a measured error in the direct current output voltage. In sample embodiments, the LLCC resonant power converter further includes a capacitor connected to the secondary transformer winding to establish the second resonant operating mode such that a resonant frequency of the secondary transformer winding and the capacitor corresponds to an odd-order multiple of an upper switching frequency limit of the switching circuit. A controller responsive to the control signal provides switching control signals to the switching circuit to operate in the first resonant operating mode at a switching frequency below the upper switching frequency limit.

Switching by the switching circuit is further controlled in the second resonant operating mode when the switching frequency is at the upper switching frequency limit. The second resonant operating mode includes duty cycle control that alternates between a first state in which the switching circuit is switched at a frequency to cause a voltage increase in the direct current output voltage and a second state in which the switching circuit is not switched to cause a voltage decrease in the direct current output voltage.

In further sample embodiments, a switch connects the capacitor to the secondary transformer winding to selectively enable the second resonant operating mode.

Methods of controlling an LLC resonant power converter to improve light load efficiency in sample embodiments include providing a first switching control signal to a switching circuit of the LLC resonant power converter in a first resonant operating mode to cause an alternating output voltage signal of the switching circuit to switch between a positive and a negative state at a switching frequency below an upper switching frequency limit. The switching frequency of the first switching control signal decreases in response to a decrease in a direct current output voltage of the LLC resonant power converter and increases in response to an increase in the direct current output voltage. A second switching control signal is provided to the switching circuit of the LLC resonant power converter in a second resonant operating mode when the switching frequency is at the upper switching frequency limit. The second resonant operating mode includes duty cycle control that alternates between a first state in which the switching circuit is switched at a frequency to cause the alternating output voltage signal to cause an increase in the direct current output voltage and a second state in which the switching circuit is not switched to cause a decrease in the direct current output voltage. The direct current output voltage as so controlled is applied to a load.

In further sample embodiments, the method includes connecting a capacitor to a secondary transformer winding when the switching frequency reaches the upper switching frequency limit of the switching circuit to enter the second resonant operating mode. A resonant frequency of the secondary transformer winding and the capacitor corresponds to an odd-order multiple of the upper switching frequency limit of the switching circuit.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The following description with respect to FIGS. 1-9 sufficiently illustrates specific embodiments to enable those skilled in the art to practice them. Other embodiments may incorporate structural, logical, process, and other changes. Portions and features of some embodiments may be included in, or substituted for, those of other embodiments. Embodiments set forth in the claims encompass all available equivalents of those claims. The example embodiments are presented for illustrative purposes only and are not intended to be restrictive or limiting on the scope of the disclosure or the claims presented herein.

Figure 1:
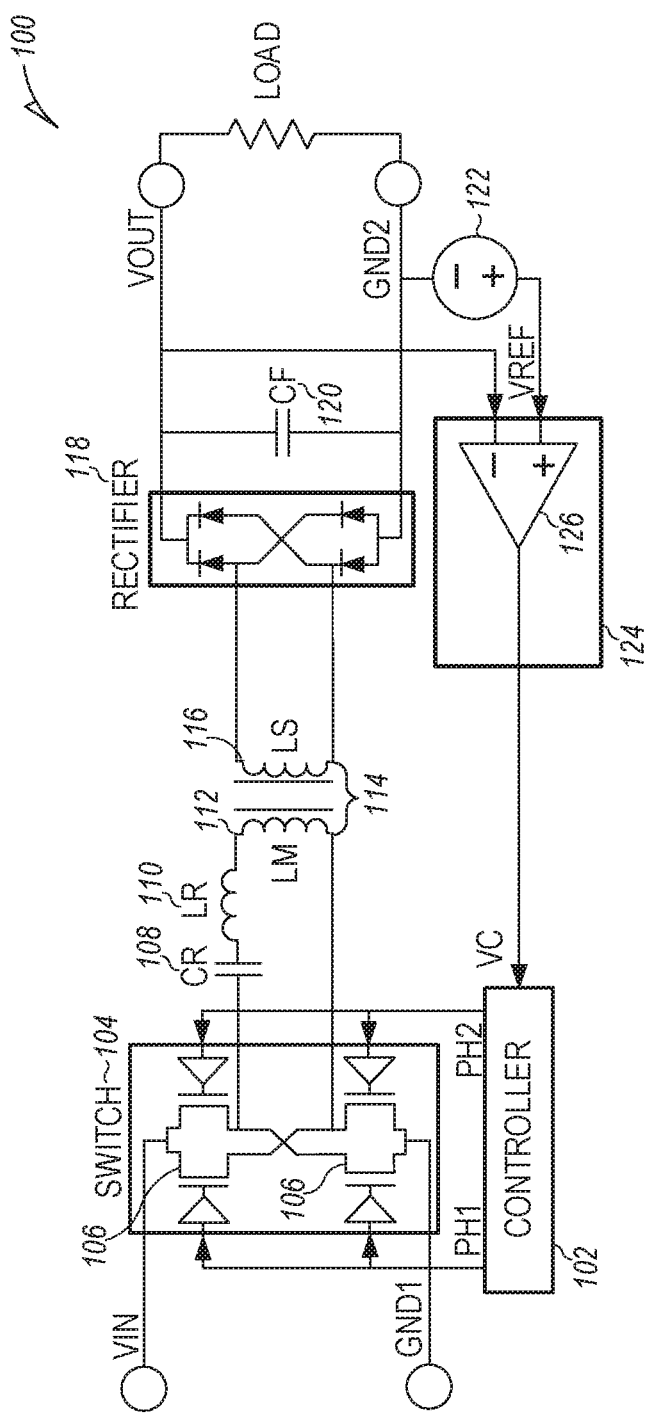
FIG. 1 illustrates an example comprising an LLC resonant power converter.

FIG. 1 illustrates an example comprising an LLC resonant power converter 100. During operation, the control circuit 102 generates an alternating two phase signal including signals PH1 and PH2 that are opposed in phase. Signals PH1 and PH2 control the power switching circuit 104 including pairs of field-effect transistors 106, which convert the DC input voltage between VIN and GNDI to an alternating output voltage in response to PH1 and PH2. The alternating output voltage is applied to the resonant circuit including capacitor CR 108, inductor LR 110, and inductor LM 112 that forms the primary winding of a transformer 114. The power applied to inductor LM 112 is magnetically coupled to the secondary winding LS 116 of the transformer 114, where it produces an alternating voltage that is applied to the rectifying circuit 118. Rectifier 118 converts the alternating voltage on secondary winding LS 116 into a direct current (DC) output voltage between VOUT and GND2. Capacitor CF 120 filters the output voltage. To compensate for errors in TOUT with frequency compensation applied for stability, a voltage source 122 supplies a reference voltage VREF to the input of a feedback circuit 124, which compares VREF to the output voltage VOUT at comparator 126. After applying frequency or phase compensation, the feedback circuit 126 generates a control signal VC that controls the switching frequency of the control circuit 102. The control of the output voltage VOUT is achieved by using a switching frequency above the resonant frequency established by the resonant circuit including capacitor 108, inductor 110, and inductor 112 such that an increase in switching frequency corresponds to a reduction in output voltage VOUT and a decrease in switching frequency corresponds to an increase in output voltage VOUT. Thus, the feedback circuit 126 and control circuit 102 work in conjunction to regulate the output voltage VOUT, such that if VOUT<VREF, the switching frequency generated by the control circuit 102 is reduced, while if VOUT>VREF, the switching frequency generated by control circuit 102 is increased.

Figure 2:
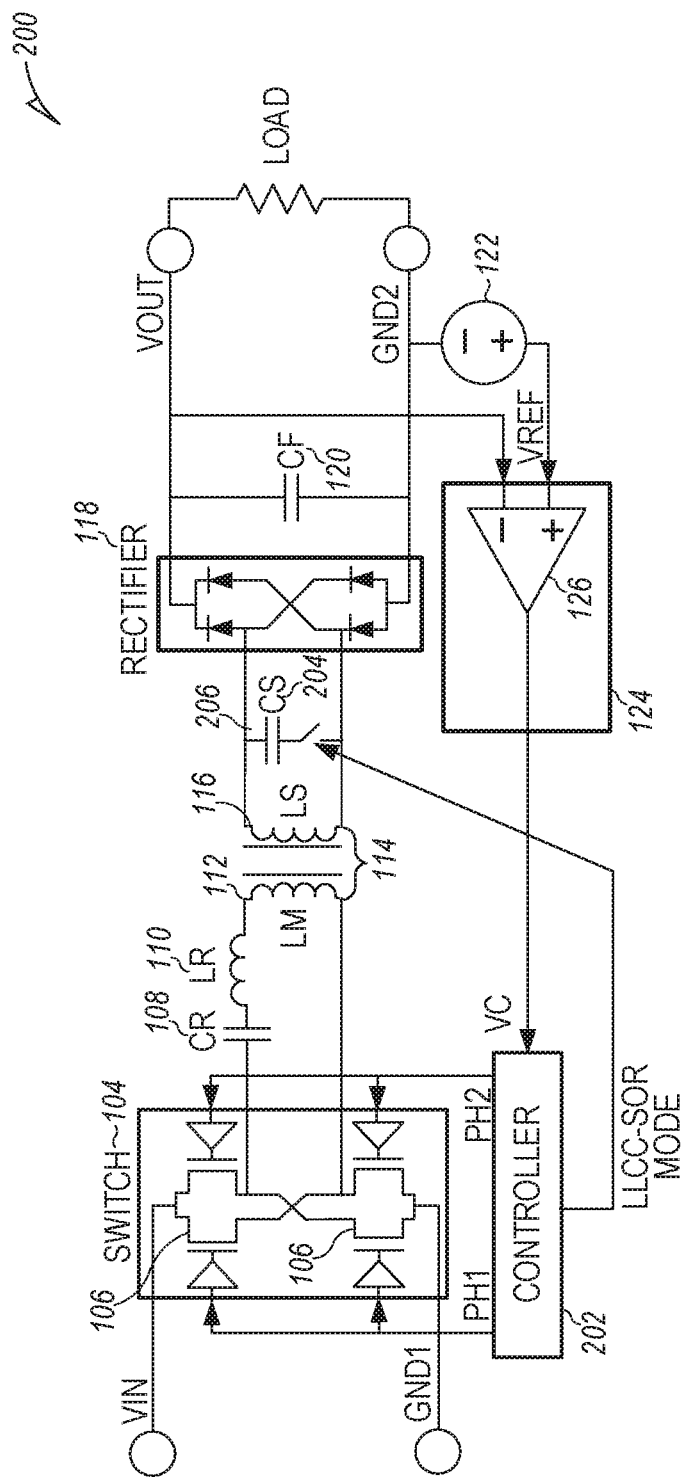
FIG. 2 illustrates a sample embodiment of an LLCC secondary overtone resonant power converter.
Figure 5:
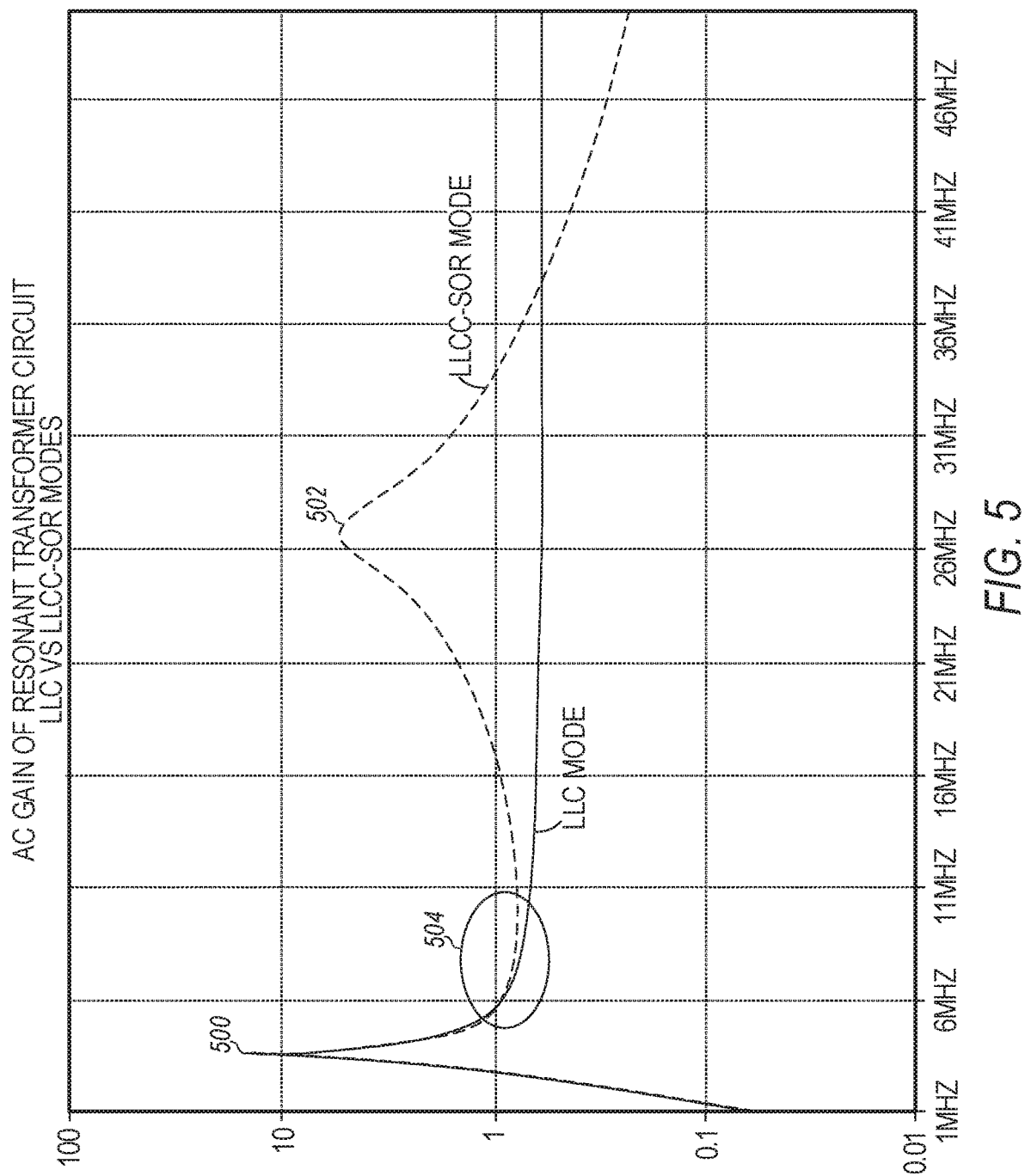
FIG. 5 illustrates the AC (sinusoidal) input voltage to output voltage gain for a resonant transformer circuit in an LLC mode and in an LLCC-SOR mode with a light load as a function of frequency in sample embodiments.

FIG. 2 illustrates a sample embodiment of an LLCC secondary overtone resonant (LLCC-SOR) power converter 200. As in the LLC resonant power converter 100 of FIG. 1, the LLCC-SOR power converter 200 may operate in an LLC mode. In LLC mode, switch 104 converts the VIN and GNDI supply to a square wave of symmetric duty cycle to drive the transformer primary winding LM 112. As noted with respect to FIG. 1, the switch 104 is driven by PH1 and PH2 from controller 102, which determines the primary switching frequency based on the feedback control signal VC (which may be a voltage, current, or digital value) generated by the voltage feedback circuit 124 on the secondary side of the transformer 114. The controller 202 regulates the output voltage VOUT by increasing the frequency to reduce the voltage or by decreasing the frequency to increase the voltage as previously described. In LLC mode, the LLCC-SOR power converter 200 works on the high frequency side of a resonant peak involving the transformer 114 magnetizing capacitor CR 108 and inductor LR 110. In the absence of other resonances, the gain of the transformer 114 decreases monotonically in LLC mode with frequency above its resonant peak as illustrated in FIG. 5.

However, in the embodiment of FIG. 2, the LLCC-SOR power converter 200 may also operate in an LLCC-SOR. mode by closing switch 204 to place filter capacitor CS 206 across the secondary winding LS 116, thereby transforming the LLC topology to the LLCC-SOR topology. Capacitor CS 206 and secondary winding LS 116 are tuned to resonate at approximately an odd multiple of the maximum switching frequency applied to the primary winding 112 by the switch 104 under control of the controller 202. Sample embodiments of the controller 202 are described below with respect to FIG. 3 and FIG. 4.

Figure 3:
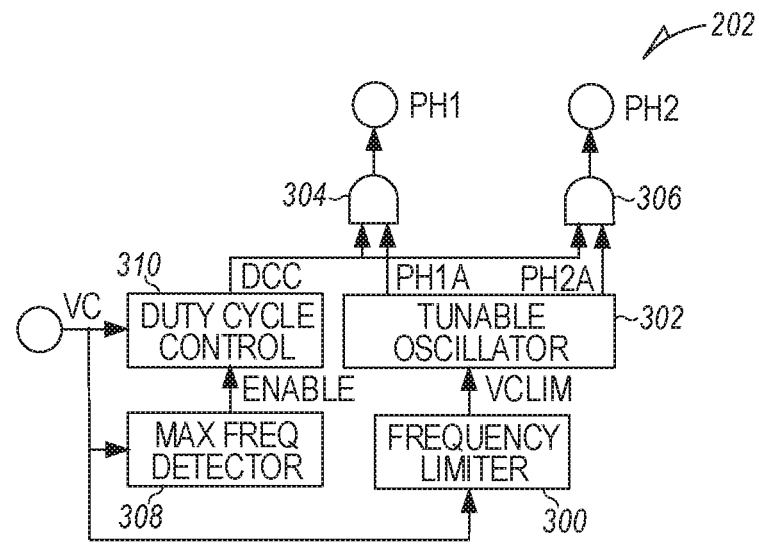
FIG. 3 illustrates a first embodiment of a controller for the LLCC secondary overtone resonant power converter of FIG. 2.

FIG. 3 illustrates a first embodiment of a controller 202 for the LLCC secondary overtone resonant power converter

200 of FIG. 2. As illustrated, the input to the controller 202 is the control signal VC from the voltage feedback circuit 124. The control signal VC is applied to a frequency limiter circuit 300, which imposes a maximum frequency value on the control signal VC. The resulting limited control signal VCLIM is applied to a tunable oscillator circuit 302, which varies the switching frequency of the switching control signals PH1*a* and PH2*a* applied to AND gates 304 and 306, respectively. Control signal VC is also applied to a maximum frequency detector circuit 308, which detects when the control signal has reached a value corresponding to the maximum frequency allowed by the frequency limiter circuit 300. In some embodiments, the frequency limiter circuit 300 and the maximum frequency detector circuit 308 may be combined into the same circuit.

The output of the maximum frequency detector circuit 308 provides an enable signal for the duty cycle control circuit 310. The duty cycle control circuit 310, when enabled by the maximum frequency detector circuit 308, responds to the control signal VC by generating a pulsed signal DCC that is applied to AND gates 304 and 306 to turn on or off the switching control signals PH1 and PH2. When DCC is on, PH1 and PH2 switch according to the signals PH1*a* and PH2*a* generated by the tunable oscillator 302. On the other hand, when DCC is off, PH1 and PH2 are off. In this manner, the duty cycle control circuit 310 may regulate the output voltage by means of changing the length of time that the DCC signal is on or the length of time that the DCC signal is off. In sample embodiments, DCC signal frequency is limited to half the maximum frequency allowed by the frequency limiter circuit 300. However, the DCC signal frequency also may be a fixed frequency that is not synchronous with the switching frequency established by the controller 202.

Figure 4:
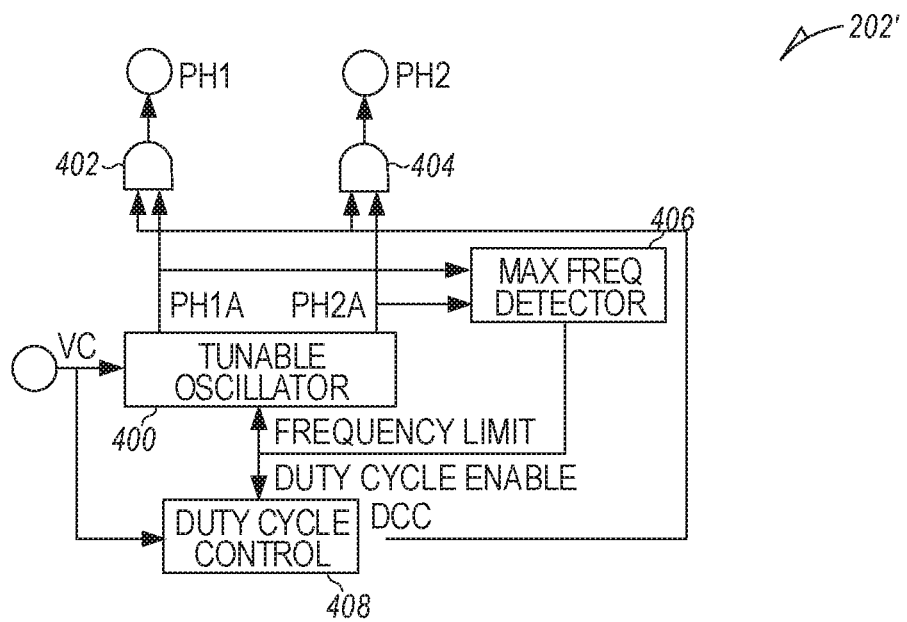
FIG. 4 illustrates a second embodiment of a controller for the LLCC secondary overtone resonant power converter of FIG. 2.

FIG. 4 illustrates a second embodiment of a controller 202' for the LLCC secondary overtone resonant power converter 200 of FIG. 2. As illustrated, the input to the controller 202' is the control signal VC from the voltage feedback circuit 124. The control signal VC is applied to a tunable oscillator circuit 400, which varies the switching frequency of the switching control signals PH1*a* and PH2*a* applied to AND gates 402 and 404, respectively. The switching control signals PH1*a* and PH2*a* are also applied to maximum frequency detector circuit 406, which detects when the switching control signals PH1*a* and PH2*a* have reached a switching frequency corresponding to a maximum frequency. The output of the maximum frequency detector circuit 406 is applied to the tunable oscillator 400 to turn on a frequency limit function that restricts the tunable oscillator 400 to oscillating at a frequency less than or equal to the maximum frequency. The output of the maximum frequency detector circuit 406 is also applied to the enable input of the duty cycle control circuit 408. The duty cycle control circuit 408, when enabled by the maximum frequency detector circuit 406, responds to the control signal VC by generating a pulsed signal DCC that turns on or off the switching control signals PH1 and PH2. When DCC is on, PH1 and PH2 switch according to the signals PH1*a* and PH2*a* generated by the tunable oscillator 400. On the other hand, when DCC is off, PH1 and PH2 are off. In this manner, the duty cycle control circuit 408 may regulate the output voltage by means of changing the length of time that the DCC signal is on or the length of time that the DCC signal is off.

FIG. 5 illustrates the AC (sinusoidal) input voltage to output voltage gain for a resonant transformer circuit in an LLC mode and in an LLCC-SOR mode with a light load as a function of frequency in sample embodiments.

As illustrated, the response of the LLCC secondary overtone resonant (LLCC-SOR) power converter 200 in LLC mode has a single gain peak 500 corresponding to the primary resonance of the transformer 114 magnetizing inductance with the resonant circuit including capacitor CR 108, inductor LR 110, and inductor LM 112. The LLC mode has no secondary resonance. On the other hand, the LLCC-SOR mode has an additional resonant peak 502 at approximately 27 MHz corresponding to the resonance of the transformer leakage inductance and the capacitor CS 206 placed across the secondary winding LS 116 of the transformer 114. It is noted that this secondary resonance in the LLCC-SOR mode has only a minor effect on the resonant gain of the fundamental frequency over the operating range of the resonant transformer circuit 200, which spans 5 MHz to 10 MHz, as illustrated at 504.

Figure 6:
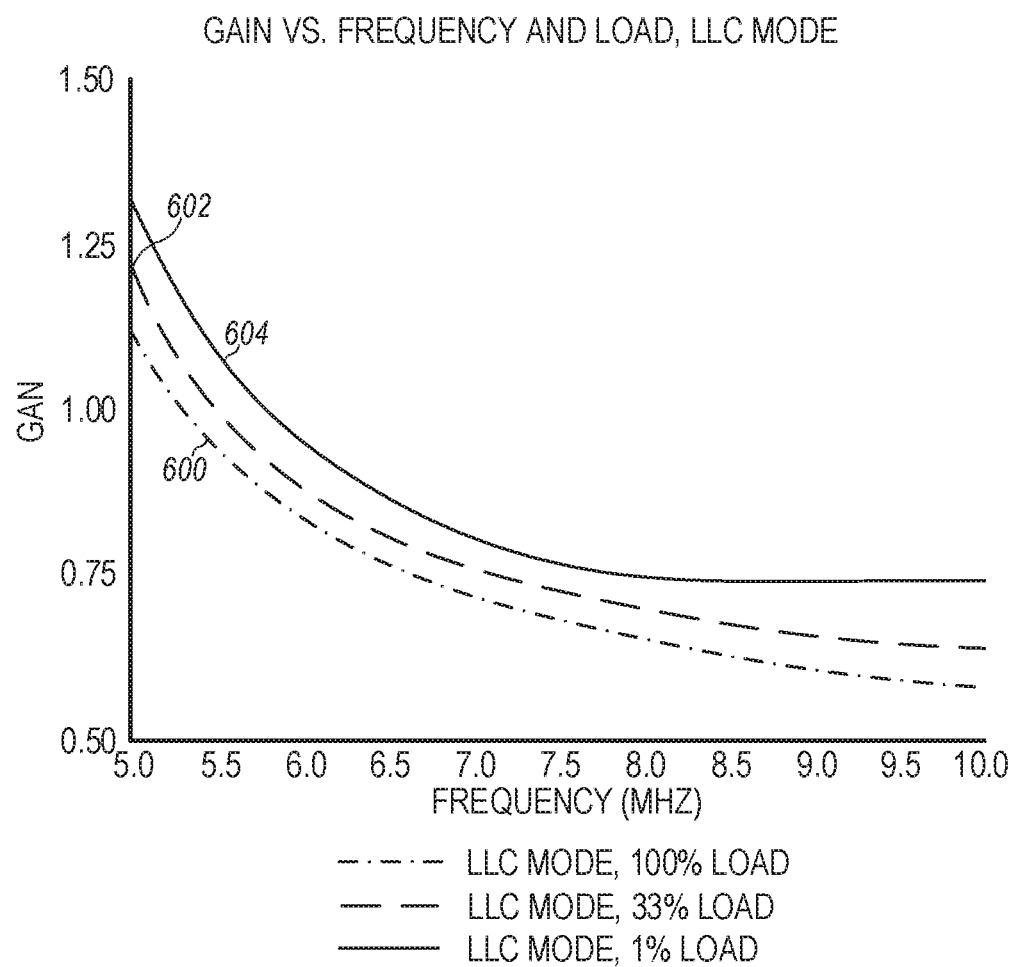
FIG. 6 illustrates the gain versus frequency and load in the LLC mode during actual switching operation of a resonant transformer circuit.
Figure 7:
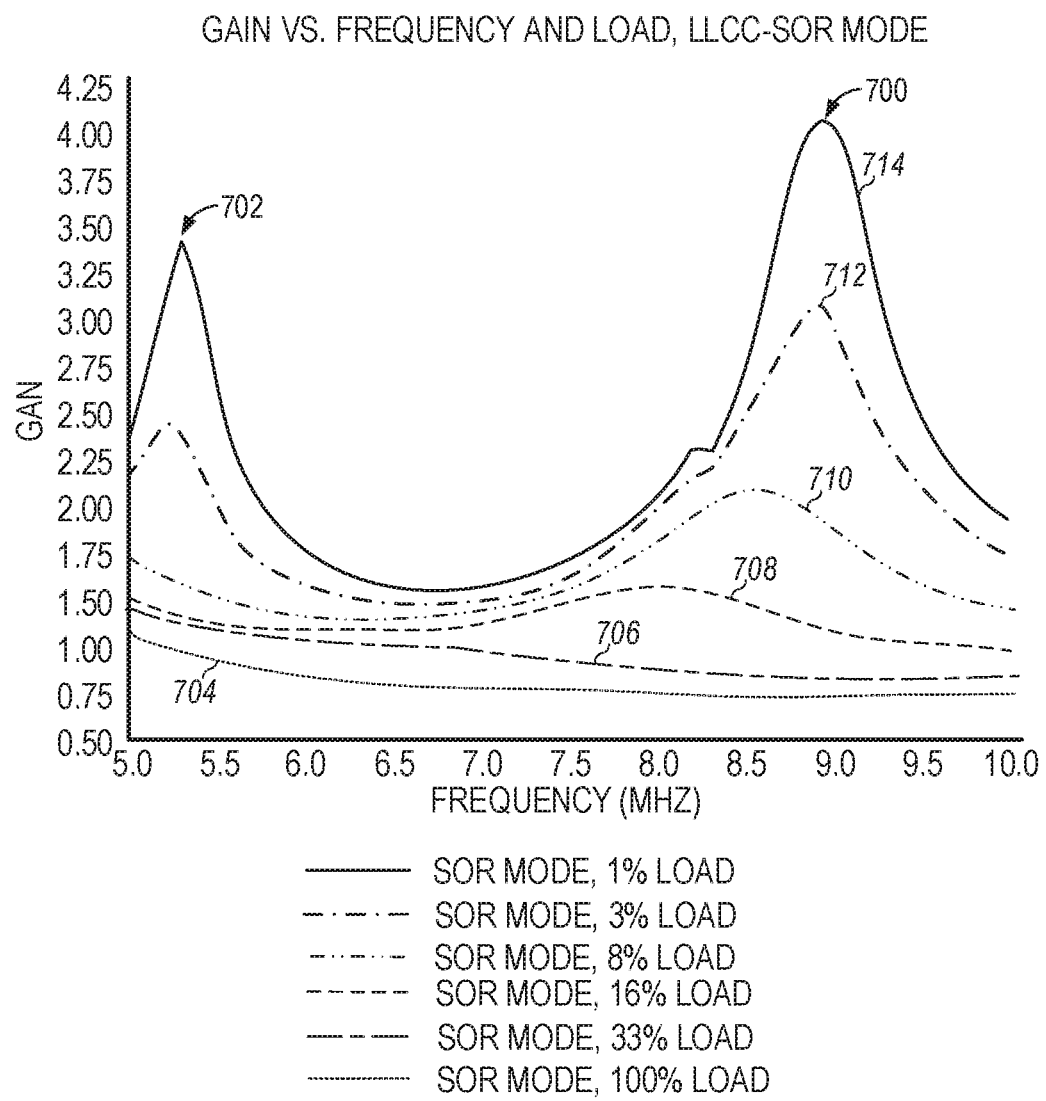
FIG. 7 illustrates the gain versus frequency and load in the LLCC-SOR mode during actual switching operation of a resonant transformer circuit in sample embodiments.

The gain versus frequency and load during actual switching operation of a resonant transformer circuit in the LLC mode and the LLCC-SOR mode are shown in FIG. 6 and FIG. 7, respectively. The driving waveforms are approximately square waves as compared to the sine wave response shown in FIG. 5. As square waves contain energy in odd-order overtones, this creates the possibility of exciting resonances higher than the switching frequency. As illustrated in FIG. 6, the gain versus frequency curves for the LLCC-SOR power converter 200 in the LLC mode for high load (100%) 600, moderate load (33%) 602, and light load (1%) 604 are a tightly grouped set. In the illustrated example, the model is for a 5 W 25V to 25V converter for micromodule applications where the 100% load condition is 5 W, and the 1% load condition is 50 mW. The desired operating point for this example is gain =1. These gain curves monotonically decrease with frequency, so the controller 202 or 202' may maintain a constant output voltage over a range of input voltages by adjusting the primary switching frequency over a narrow range to maintain gain=1 over a wide range of load current.

By comparison, the LLCC-SOR mode curves shown in FIG. 7 show pronounced effects of the secondary resonances. In FIG. 7, the gain versus frequency curves for the LLCC-SOR power converter 200 in the LLCC-SOR mode for high load (100%) 704 and moderate load (33%) 706 are a tightly grouped set; however, the gain rises significantly at 700 and 702 for the light loads at 16% (708), 8% (710), 3% (712), and 1% (714). The 26.7 MHz secondary resonance is excited by the 3rd-order overtone at 700 when f=8.9 MHz, and by the 5th-order overtone at 702 when f=5.3 MHz, creating large boosts in the gain of the LLCC-SOR power converter 200 around those frequencies, which is particularly pronounced for the lighter loads. As in the LLC mode, the controller 202 or 202' operates at the gain =1 point. The secondary overtone resonances cause the gain =1 point to shift towards higher frequencies as the load decreases. The LLCC-SOR controller 202 and 202' will adjust the switching frequency to maintain the gain =1 condition for heavy to moderate loads; however, for the LLCC-SOR mode with a light load, the secondary resonances lift the gain to exceed 1 for all frequencies in the allowed range for lighter loads, which prevents the frequency control from reaching equilibrium. This forces the feedback to its maximum value and the frequency to its maximum value, where the duty cycle control takes over and regulates in duty cycle mode. Thus, under light loads, the frequency will reach its maximum value (e.g. 10 MHz), and the LLCC-SOR controller 202 or 202' will enter its secondary duty cycle control mode (e.g., burst mode, hysteretic mode, PWM mode) to maintain voltage regulation. During the duty cycle control mode, the LLCC-SOR controller 202 or 202' will alternate between periods of switching at the maximum frequency and periods where switching is turned off.

Figure 8:
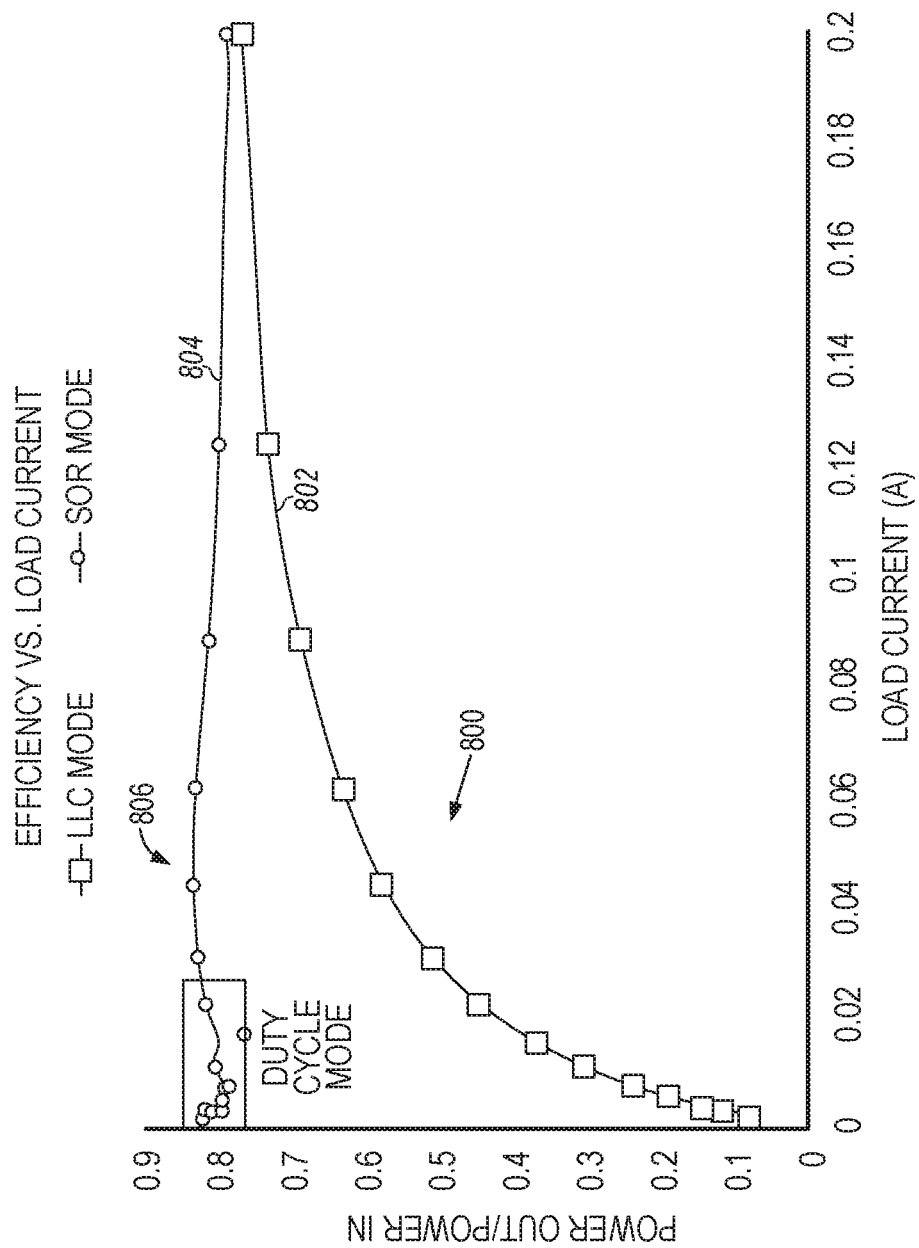
FIG. 8 illustrates the efficiency of the LLC mode and the LLCC-SOR mode of the LLC resonant power converter as a function of load current.

FIG. 8 illustrates the efficiency of the LLC mode and the LLCC-SOR mode of the LLCC-SOR power converter 200 as a function of load current. As illustrated at 800, the efficiency of the LLC mode is marked by a pronounced drop-off of efficiency at small load currents, due to the large amount of current resonating in the primary winding 112 even when little current is being drawn from the secondary winding 116. The power lost in the primary resonance remains fairly constant even as the power delivered by the secondary decreases, resulting in poor conversion efficiency at light loads. This efficiency rolloff is pronounced in the example model that simulates a miniaturized converter with a small 3 uH transformer. The low reactance of the transformer results in a large circulating current. The efficiency of the LLCC-SOR mode 804, by comparison, increases as the load current decreases at illustrated at 806 and remains high at the lightest loads as the controller enters duty cycle mode.

Thus, as illustrated in FIG. 8, the efficiency increases in the LLCC-SOR mode by tuning the secondary resonance. Peak efficiency is obtained when the secondary winding 116 oscillates at an odd-order overtone of the primary switch frequency. An additional efficiency gain occurs when duty cycle mode is entered at light loads. It will be appreciated by those skilled in the art that the high efficiency of the LLCC-SOR power converter 200 under light load is due to several factors:

1. The secondary overtone resonances increase the resonant circuit gain and forces the controller 202/202' to use higher frequencies to maintain regulation at the gain =1 point for light loads, as may be seen in FIGS. 6-7. This increases the reactance of the primary winding 112 and reduces the primary current, thereby reducing power dissipation in the primary circuit.

2. The controller 202/202' switches into its secondary duty cycle mode (e.g., burst mode) at or near the most efficient frequency for secondary overtone resonant (SOR) operation, thereby preserving this high efficiency all the way down to zero load. It is noted that the efficiency calculations for the model illustrated in FIGS. 6-7 does not include any DC quiescent current of the converter circuits.

3. The LLCC-SOR mode entails a different mechanism of power transfer through the transformer 114 than the LLC mode. One unique feature of this mode is that the primary current returns to approximately zero and stays there through a significant portion of the cycle, thereby reducing primary power dissipation, as explained below with respect to FIG. 9.

Figure 9A:
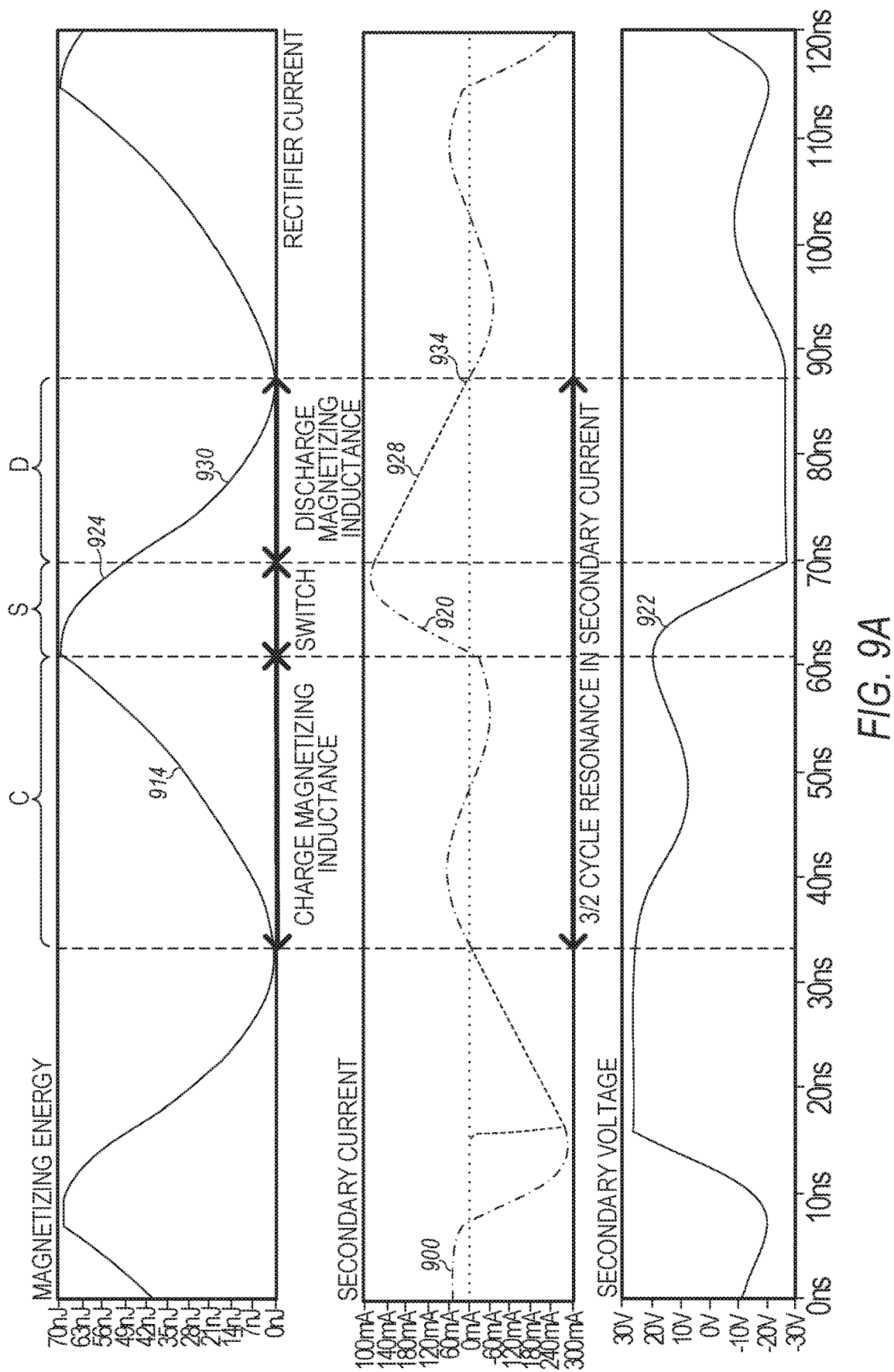
FIGS. 9A and 9B together illustrate the switching waveforms for the LLCC-SOR mode in sample embodiments.
Figure 9B:
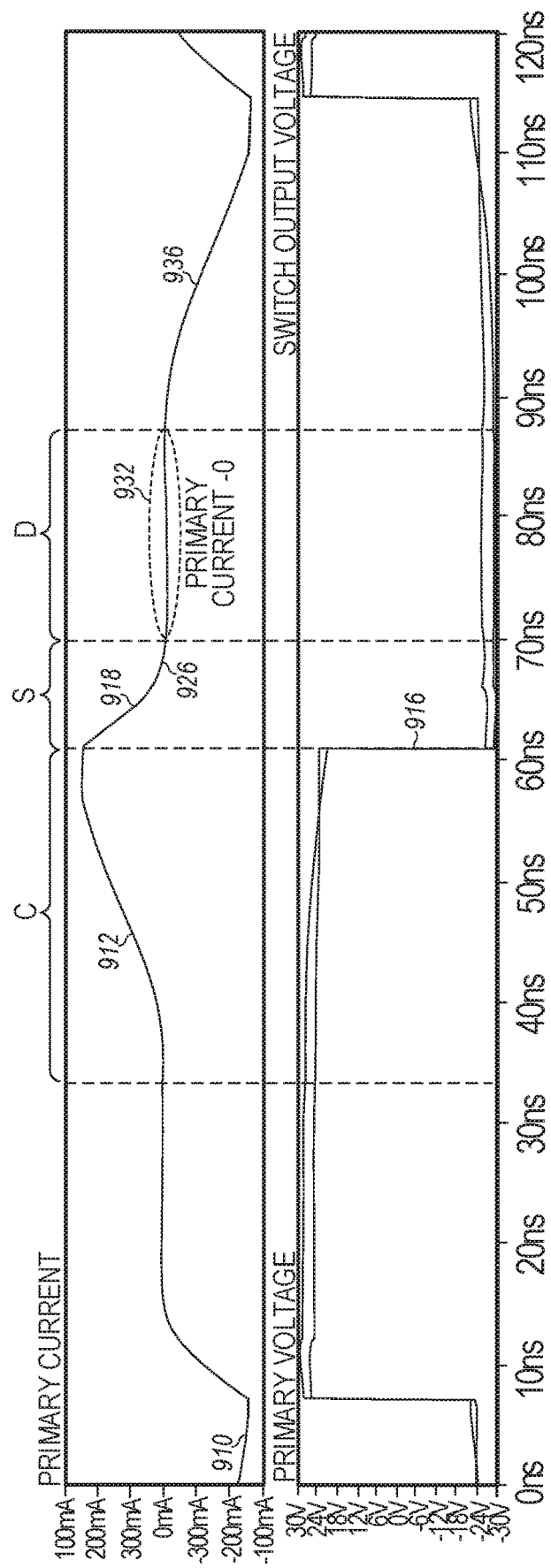

FIGS. 9A and 9B together illustrate the switching waveforms that reveal the mechanisms for the enhanced efficiency in the LCC-SOR mode. The secondary overtone resonance (SOR) may be observed in the secondary current waveform 900, which shows 3 cycles of oscillation per full cycle of the primary current 910. Each switching half cycle may be divided into 3 separate phases:

1. Charging Phase (C): Before a switching transition, the primary current ramps up in magnitude at 912, charging the magnetizing inductance of the transformer 114. As the primary current increases, the magnetizing energy in the transformer increases as illustrated at 914.

2. Switching Phase (S): The switching phase is initiated by the switching of the primary voltage as illustrated at 916. This switching results in the ramp down of the primary current to zero at 918 when the rectifier 118 starts to conduct. Simultaneously, the secondary current ramps up at 920 and the secondary voltage switches polarity at 922. Some of the stored magnetic energy is used to effect the switching transition, and the magnetizing energy starts to discharge at 924. The current in the primary winding 112 decreases to zero at 926.

3. Discharge Phase (D): The secondary winding 116 conducts into the rectifier 118 and the secondary current decreases linearly at 928 while the magnetizing inductance discharges at 930, thereby discharging the remaining stored magnetic energy into the output filter capacitor 120 and the load. The primary current stays approximately at zero during the entire discharge phase, as illustrated at 932.

It will be appreciated that a key advantage of the LLCC-SOR mode is that the primary current returns to approximately zero immediately after the switching transition and stays at approximately zero until the rectifier current returns to zero at 934. Only then does the primary current start to increase, as illustrated at 936. This results in low power dissipation in the primary winding 112 since the primary winding 112 draws no current and hence dissipates no power during a large portion of the switching cycle. It may also be seen from FIGS. 9A and 9B that the transfer of energy from the primary winding 112 to the secondary winding 116 is discontinuous, with the transfer of energy into the primary winding 112 and the transfer of energy out of the secondary winding 116 occurring during two non-overlapping periods.

Also, two other factors work to reduce the primary current. First, the primary current is limited by the magnetizing inductance in the LLCC-SOR mode (similar to a flyback converter) as compared to the smaller leakage inductance in the LLC mode. Second, the switching frequency is higher in the LLCC-SOR mode compared to the LLC mode. These factors also contribute to the high conversion efficiency but limit the amount of power that may be delivered in the LLCC-SOR mode.

The above detailed description includes references to the accompanying drawings, which form a part of the detailed description. The drawings show, by way of illustration, specific embodiments in which the invention may be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein may be machine or computer-implemented at least in part.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure, it is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. An LLCC resonant power converter, comprising:
    a switching circuit that receives a direct current input voltage and provides an alternating output voltage to a primary transformer winding in first and second resonant operating modes;
    a rectifier that converts an alternating current at a secondary transformer winding into a direct current output voltage for application to a load;
    a feedback circuit that generates a control signal to reduce a measured error in the direct current output voltage;
    a capacitor connected to the secondary transformer winding to establish the second resonant operating mode such that a resonant frequency of the secondary transformer winding and the capacitor corresponds to an odd-order multiple of an upper switching frequency limit of the switching circuit; and
    a controller responsive to the control signal to provides switching control signals to the switching circuit to operate in the first resonant operating mode at a switching frequency below the upper switching frequency limit, and in the second resonant operating mode when the switching frequency is at the upper switching frequency limit, the second resonant operating mode including duty cycle control that alternates between a first state in which the switching circuit is switched at a frequency to cause a voltage increase in the direct current output voltage and a second state in which the switching circuit is not switched to cause a voltage decrease in the direct current output voltage.

2. The LLCC resonant power converter of claim 1, further comprising a switch that connects the capacitor to the secondary transformer winding.

3. The LLCC resonant power converter of claim 1, wherein the controller comprises an upper switching frequency limit detector that detects when the control signal is at the upper switching frequency.

4. The LLCC resonant power converter of claim 3, wherein the controller further comprises a duty cycle control circuit that is enabled by the upper switching frequency limit detector when the control signal is at the upper switching frequency limit, the duty cycle control circuit providing a duty cycle control output signal that alternates between the first state and the second state to control application of the switching control signal to the switching circuit.

5. The LLCC resonant power converter of claim 4, wherein the controller further comprises a frequency limiter responsive to the control signal to limit the switching control signal to the upper switching frequency limit.

6. The LLCC resonant power converter of claim 5, wherein the controller further comprises at least one gating circuit and a tunable oscillator responsive to a voltage control limit signal from the frequency limiter, the tunable oscillator providing alternating outputs that are gated with the duty cycle control output signal by the at least one gating circuit to limit the switching control signal to the upper switching frequency limit in the first state.

7. The LLCC resonant power converter of claim 1, wherein the controller comprises a tunable oscillator responsive to the control signal, the tunable oscillator outputting the switching control signal as alternating outputs.

8. The LLCC resonant power converter of claim 7, wherein the controller further comprises an upper switching frequency limit detector that detects when the switching control signal from the tunable oscillator is at the upper switching frequency limit, limits the tunable oscillator to the upper switching frequency limit, and switches the controller to the second resonant operating mode when the switching control signal is at the upper switching frequency limit.

9. The LLCC resonant power converter of claim 8, wherein the controller further comprises a duty cycle control circuit that is enabled by the upper switching frequency limit detector when the switching control signal is at the upper switching frequency limit, the duty cycle control circuit duty providing a duty cycle control output signal that alternates between the first state and the second state to control application of the switching control signal to the switching circuit.

10. The LLCC resonant power converter of claim 9, wherein the controller further comprises at least one gating circuit responsive to the alternating outputs from the tunable oscillator and the duty cycle control output signal to limit the switching control signal to the upper switching frequency limit in the first state.

11. The LLCC resonant power converter of claim 1, wherein the duty cycle control frequency alternates between the first state and the second state at a fixed frequency less than half the upper limit frequency.

12. The LLCC resonant power converter of claim 1, wherein the duty cycle control frequency alternates between the first state and the second state at a variable frequency less than half the upper limit frequency.

13. A method of controlling an LLC resonant power converter to improve light load efficiency, comprising:
    providing a first switching control signal to a switching circuit of the LLC resonant power converter in a first resonant operating mode to cause an alternating output voltage signal of the switching circuit to switch between a positive and a negative state at a switching frequency below an upper switching frequency limit, the switching frequency of the first switching control signal decreasing in response to a decrease in a direct current output voltage of the LLC resonant power converter and increasing in response to an increase in the direct current output voltage;
    providing a second switching control signal to the switching circuit of the LLC resonant power converter in a second resonant operating mode when the switching frequency is at the upper switching frequency limit, the second resonant operating mode including duty cycle control that alternates between a first state in which the switching circuit is switched at a frequency to cause the alternating output voltage signal to cause an increase in the direct current output voltage and a second state in which the switching circuit is not switched to cause a decrease in the direct current output voltage; and applying the direct current output voltage to a load.

14. The method as in claim 13, further comprising connecting a capacitor to a secondary transformer winding to enter the second resonant operating mode, wherein a resonant frequency of the secondary transformer winding and the capacitor corresponds to an odd-order multiple of the upper switching frequency limit of the switching circuit.

15. The method as in claim 14, further comprising detecting when a control signal generated to reduce a measured error in the direct current output voltage is at the upper switching frequency limit and switching the LLC resonant power converter to the second resonant operating mode when the control signal is at the upper switching frequency limit.

16. The method as in claim 15, further comprising enabling duty cycle control when the control signal is at the upper switching frequency limit, a duty cycle control signal alternating between the first state and the second state to control application of the second switching control signal to the switching circuit.

17. The method as in claim 16, further comprising limiting the second switching control signal to a fixed frequency less than half the upper limit frequency.

18. The method as in claim 17, further comprising gating outputs of a tunable oscillator limited to the upper switching frequency limit with the duty cycle control signal.

19. An LLC resonant power converter, comprising:

means for providing a first switching control signal to a switching circuit of the LLC resonant power converter in a first resonant operating mode to cause an alternating output voltage signal of the switching circuit to switch between a positive and a negative state at a switching frequency below an upper switching frequency limit, the switching frequency of the first switching control signal increasing in response to a decrease in a direct current output voltage of the LLC resonant power converter and decreasing in response to an increase in the direct current output voltage;

means for providing a second switching control signal to the switching circuit of the LLC resonant power converter in second resonant operating mode when the switching frequency is at the upper switching frequency limit, the second resonant operating mode including duty cycle control that alternates between a first state in which the switching circuit is switched at a frequency to cause the alternating output voltage signal to cause an increase in the direct current output voltage and a second state in which the switching circuit is not switched to cause a decrease in the direct current output voltage; and means for applying the direct current output voltage to a load.

20. The resonant power converter of claim 19, further comprising a capacitor that is connected to a secondary transformer winding to enter the second resonant operating mode, wherein a resonant frequency of the secondary transformer winding and the capacitor corresponds to an odd-order multiple of the upper switching frequency limit of the switching circuit.

* * * * *